United States Patent
Qu et al.

(10) Patent No.: US 11,956,109 B2
(45) Date of Patent: Apr. 9, 2024

(54) LOW-COMPUTATION UNDERWATER ACOUSTIC WAKE-UP METHOD BASED ON MULTI-CARRIER SIGNALS

(71) Applicant: Zhejiang University, Zhoushan (CN)

(72) Inventors: Fengzhong Qu, Zhoushan (CN); Zhe Lin, Zhoushan (CN); Yan Wei, Zhoushan (CN); Yezhou Wu, Zhoushan (CN)

(73) Assignee: ZHEJIANG UNIVERSITY, Zhoushan (CN)

( * ) Notice: Subject to any disclaimer, the term of this patent is extended or adjusted under 35 U.S.C. 154(b) by 190 days.

(21) Appl. No.: 17/709,747

(22) Filed: Mar. 31, 2022

(65) Prior Publication Data

US 2022/0321390 A1    Oct. 6, 2022

(30) Foreign Application Priority Data

Apr. 6, 2021    (CN) .......................... 202110368158.4

(51) Int. Cl.
  *H04L 27/26* (2006.01)
  *H04B 13/00* (2006.01)
(52) U.S. Cl.
  CPC ......... *H04L 27/2614* (2013.01); *H04B 13/00* (2013.01); *H04L 27/265* (2013.01)

(58) Field of Classification Search
  CPC ........ H04B 11/00; H04B 13/00; H04B 13/02; H04L 27/2649; H04L 27/2613; H04L 27/2621; H04L 27/2614; H04L 27/265
  See application file for complete search history.

(56) References Cited

FOREIGN PATENT DOCUMENTS

| CN | 104243369 A | * | 12/2014 | |
|---|---|---|---|---|
| CN | 112217577 A | * | 1/2021 | ............. H04B 13/02 |
| CN | 112583495 A | * | 3/2021 | ............. H04B 13/02 |
| CN | 113114147 A | * | 7/2021 | ............... H03F 3/45 |
| WO | WO-2020113464 A1 | * | 6/2020 | |

\* cited by examiner

*Primary Examiner* — Daniel L Murphy
*Assistant Examiner* — Amie M Ndure
(74) *Attorney, Agent, or Firm* — Zhigang Ma

(57) ABSTRACT

A low-computation underwater acoustic wake-up method based on a multi-carrier signal is provided. A multi-carrier signal corresponding to communication nodes is constructed, absolute values of the multi-carrier signal in a window at a receiver are summed for signal arrival detection, and then frequency points of the multi-carrier signal are detected many times by using the real fast Fourier transform to realize wake-up detection. The method is suitable for accurate wake-up at any distance within a maximum communication distance of two underwater acoustic nodes, has a small amount of calculation, and is suitable for low-power single-chip microcomputers. The modem can be in a low-power sleep state for a long time.

3 Claims, 2 Drawing Sheets

LOW-COMPUTATION UNDERWATER ACOUSTIC WAKE-UP METHOD BASED ON MULTI-CARRIER SIGNALS

TECHNICAL FIELD

The disclosure relates to the field of underwater acoustic modems, and more particularly to a low-computation underwater acoustic wake-up method based on multi-carrier signals.

BACKGROUND

In recent years, with the acceleration of ocean development all over the world, countries all over the world begin to study the underwater acoustic communication network, which greatly promotes the development of underwater acoustic communication systems. Underwater acoustic communications have become a hot research content at present. Underwater acoustic modems are the main application form of most underwater acoustic communication systems. It is generally used in marine monitoring, remote control, and telemetry of various underwater platform equipment. It is required to have high communication robustness.

When underwater acoustic modems use batteries for underwater information transmission, the power consumption of the batteries will be large because of the high-power consumption during operation, thus the underwater acoustic modems need to replace the batteries frequently to support long-term communication. In order to reduce power consumption, underwater acoustic modem needs a low power consumption mode. In this mode, the modem maintains a very low power consumption when it is not communicating, and it only needs a specific waveform to wake up.

Therefore, it is necessary to select a specific waveform as the wake-up waveform and design the corresponding detection algorithm. The detection algorithm is resistant to ocean noise and in-band interference.

SUMMARY

The disclosure proposes a low-computation underwater acoustic wake-up method based on a multi-carrier signal, which is used for ensuring that a single-chip microcomputer is in a low-computation and low-power consumption mode during wake-up detection, ensuring high wake-up success rate and low wake-up failure rate while ensuring low complexity, and ensuring that the underwater acoustic modem can be effectively woken up at any distance within the maximum communication distance. The specific technical solution is as follows.

Specifically, a low-computation underwater acoustic wake-up method based on a multi-carrier signal may include steps as follows.

Step S1: generating the multi-carrier signal at the transmitter, including:

step S101: obtaining the frequency band of the multi-carrier signal B and parameters required for the receiver to detect the multi-carrier signal, wherein the parameters include the sampling rate Fs of the single-chip microcomputer which is in the receiver, the data buffer size N when the receiver receives the multi-carrier signal, a group number K of N numbers of elements, the time-domain threshold $W_1$, the threshold $N_A$ of the number of the cases where the amplitudes of the wake-up frequency points of groups are greater than the frequency-domain threshold, and the wake-up threshold $N_K$; and K is a positive integer, N is a positive integer;

step S102: calculating frequency points to be selected according to the obtained parameters, and selecting the wake-up frequency points from the frequency points to be selected which are the frequencies carried by the multi-carrier signal;

step S103: determining the duration T of the multi-carrier signal; and step S104: shifting the phases of the respective wake-up frequency points to generate the multi-carrier signal with the minimum peak to average power ratio (PAPR); storing the generated multi-carrier signal at the transmitter and transmitting the multi-carrier signal for waking up the receiver.

Step S2: detecting the multi-carrier signal at the receiver, including:

step S201: passing the multi-carrier signal received through an transducer and then through an amplifier circuit and an analog-to-digital converter, to convert the received multi-carrier signal in analog form into a digital signal, and obtaining the data of the multi-carrier signal after the conversion of analog-to-digital;

step S202: setting the parameters in the step S101;

step S203: storing N-length data of the multi-carrier signal in the first buffer in real time, to obtain buffered data;

step S204: setting a timer for triggering detecting of the multi-carrier signal received at a certain time interval, and re-storing the buffered data in a second buffer with the same length during the detecting;

step S205: taking absolute values of elements in the second buffer and summing the absolute values to obtain the sum $S_1$;

S206: comparing the sum with the time-domain threshold, entering step S207 when the sum is greater than the time-domain threshold; or returning to the step S204 and waiting for the timer to trigger again when the sum is not greater than the time-domain threshold;

step S207: dividing the N numbers of elements into K numbers of groups, with N/K numbers of elements in each of the K numbers of groups, and obtaining the number of the wake-up frequency points whose amplitudes in each of the K number of groups are greater than the frequency-domain threshold by performing the following steps for each of the K numbers of groups:

step S208: performing real Fourier transform on the elements in the current group to obtain amplitudes of N/2K frequency points;

step S209: selecting the amplitudes respectively corresponding to the wake-up frequency points from the amplitudes of the N/2K frequency points, and selecting amplitudes of frequency points between the wake-up frequency points from the amplitudes of the N/2K frequency points as reference amplitudes;

step S210: weighting the reference amplitudes to obtain the frequency-domain threshold;

step S211: comparing each of the amplitudes of the wake-up frequency points with the frequency-domain threshold to obtain the number of the wake-up frequency points whose amplitudes are greater than the frequency-domain threshold; and step S212: comparing the number of the wake-up frequency points of each groups whose amplitudes are greater than the frequency-domain threshold with the threshold, and recording the number of the groups with the number greater than the threshold; turning on the power supply of the rear-end circuit when the number of the recorded groups is greater than the wake-up threshold, or returning to the step S204 when the number of the recorded groups is not greater than the wake-up threshold.

In an embodiment, the calculating frequency points to be selected in the step S102 according to a formula $\Delta f=k*Fs/N$, where $\Delta f$ presents the step size, K presents the group number, Fs presents the sampling rate, N represents the data buffer size.

In an embodiment, shifting the phases of the respective wake-up frequency points to generate the multi-carrier signal with the minimum peak to average power ratio specifically includes: randomly superposing phase changes when generating a single-frequency signal; calculating PAPRs of the signal superposed with the phase changes during synthesizing the multi-carrier signal; obtaining the phase corresponding to the minimum one of the calculated PAPRs as the resultant phase; and generating the multi-carrier signal by using the resultant phase.

Compared with the related art, the embodiment of the disclosure may mainly have the following beneficial effects.
(1) According to the underwater acoustic wake-up method of the disclosure, due to the adoption of the real number fast Fourier transform, the multiplication operation can be reduced by using the symmetry of the transform or the fast Hartley transform, and the multiplication operation amount can be reduced by about one half and the power consumption is reduced.
(2) The underwater acoustic wake-up method of the disclosure uses $N_a$ as a variable of current wake-up detection, and can effectively confront common frequency selective underwater acoustic channels.
(3) The underwater acoustic wake-up method of the disclosure further uses $N_k$ as a variable for detecting wake-up, so that a section of data is used to perform multiple frequency point determinations, thereby reducing the probability of false wake-up caused by noise.
(4) The method of the disclosure selects a specific waveform as the wake-up waveform, ensuring a high wake-up success rate and a low wake-up failure rate while ensuring low complexity. The method is suitable for accurate wake-up at any distance within the maximum communication distance of two underwater acoustic nodes, with a small amount of calculation, and is suitable for the single-chip microcomputer with low power consumption. The modem can be in a sleep state with low power consumption for a long time.

DETAILED DESCRIPTION OF EMBODIMENTS

The disclosure will be described in detail below according to the attached drawings and illustrated embodiment, and the purpose and effect of the disclosure will become clearer. It should be understood that the specific embodiment described herein are only used to explain the disclosure and are not used to limit the disclosure.

The low-computation underwater acoustic wake-up method based on multi-carrier signals of the disclosure may include steps as follows.

Step S1: generating the multi-carrier signal at the transmitter.

Step S101: obtaining the frequency band B of the multi-carrier signal and parameters required for a receiver detecting the multi-carrier signal. The parameters may include the sampling rate Fs of the single-chip microcomputer (also referred to as microcontroller unit, i.e., MCU), the data buffer size N when the receiver receives detecting the multi-carrier signal, the group number K of N numbers of elements, the time-domain threshold $W_1$, the threshold $N_A$ of the number of the wake-up frequency points selected in current group whose amplitudes are greater than a frequency-domain threshold, and the wake-up threshold $N_K$; and K is a positive number. In the illustrated embodiment, the frequency band B of the given energy transducer is 7-16 kilohertz (kHz), the sampling rate Fs is 66.67 kHz, the received data buffer size N is 1024, the group number K is 4, the time-domain threshold $W_1$ is 300000, the threshold $N_A$ is 3, and the wake-up threshold $N_K$ is 3.

Step S102: calculating frequency points to be selected by using $\Delta f=k*Fs/N$ according to the obtained parameters, and selecting appropriate multiple frequency points $f_1$, $f_2$, ..., $f_M$ from the frequency points to be selected as the frequencies carried by the multi-carrier signal. In the illustrated embodiment, the frequency points to be selected are from 7031 Hz to 15885 Hz in 260 Hz steps. Finally, the appropriate multiple frequency points, i.e., four frequency points of 8073 Hz, 10416 Hz, 12760 Hz and 15104 Hz are selected as the wake-up frequency points.

Step S103: determining a duration T of the multi-carrier signal. In the illustrated embodiment, the duration T is determined to be 100 milliseconds (ins).

Figure 1:
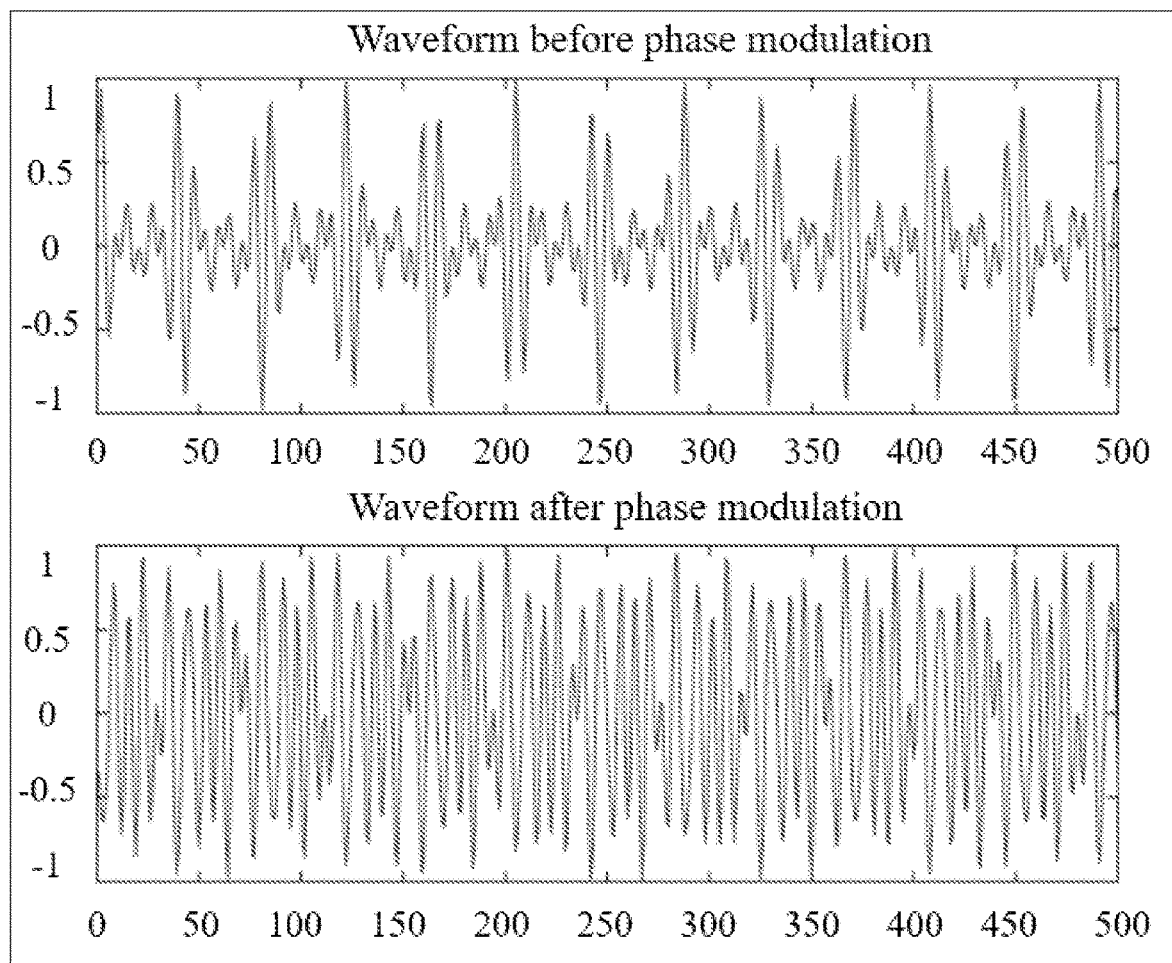
FIG. 1 shows a transmitted multi-carrier signal with a specific peak to average power ratio (PAPR).

Step S104: shifting phases of the respective wake-up frequency points to generate the multi-carrier signal with the minimum peak to average power ratio (PAPR); storing the generated multi-carrier signal at the transmitter and transmitting the multi-carrier signal for waking up the receiver. The PAPR is the ratio of the signal power peak to the average power. In the illustrated embodiment, by shifting the phases of the respective wake-up frequency points 10000 times, the PAPR of the whole signal of the finally synthesized multi-carrier signal is reduced from the original 7.98 to 3.42. The waveforms before and after phase modulation are shown in FIG. 1.

Figure 2:
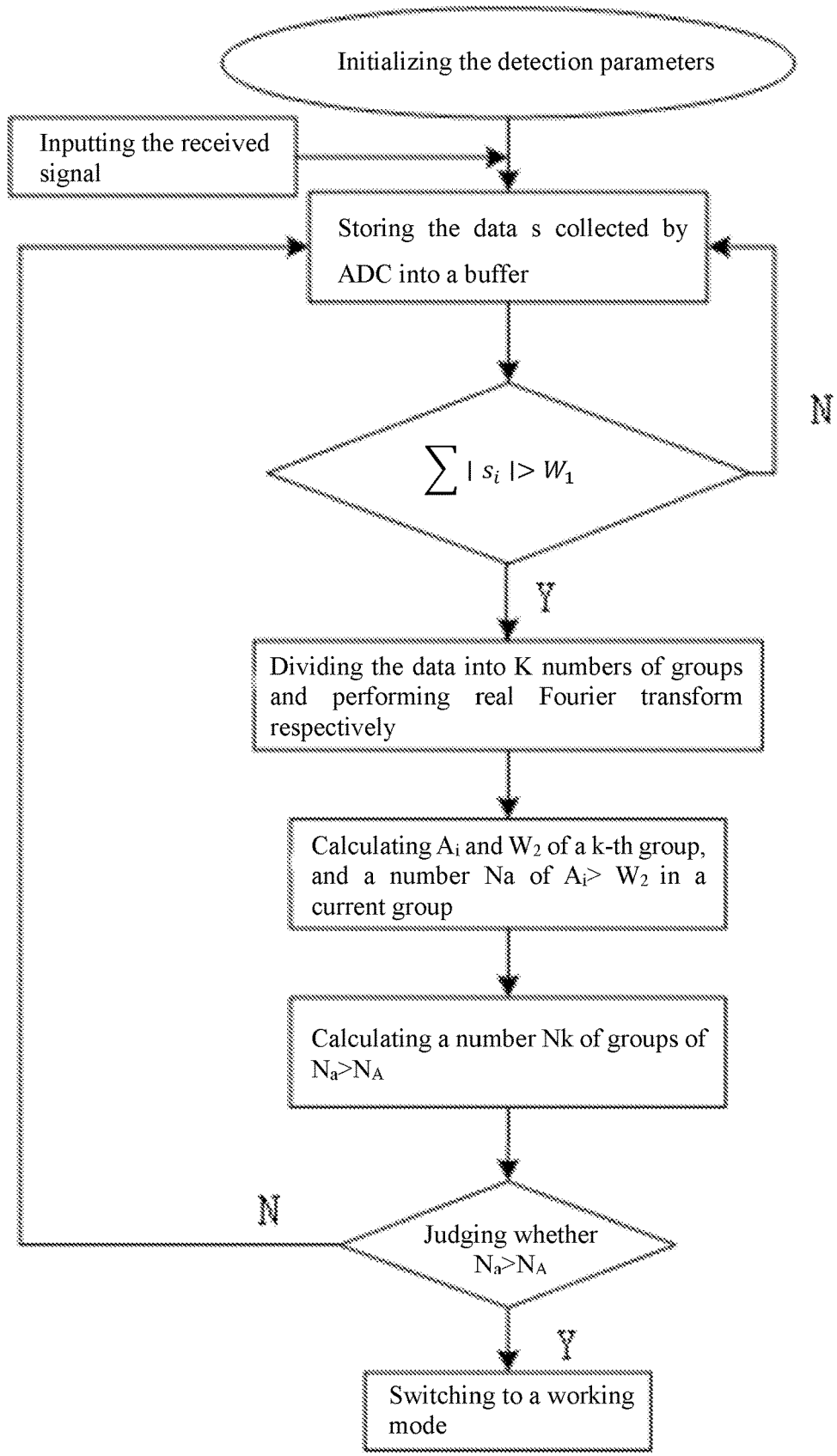
FIG. 2 is a flowchart of wake-up detection in a low-computation underwater acoustic wake-up method based on multi-carrier signals of the disclosure.

Step S2: detecting the multi-carrier signal at the receiver, as shown in FIG. 2. The specific process may include S201 through S212 as follows.

Step S201: passing the multi-carrier signal received by the receiver through the energy transducer and then through an amplifier circuit and an analog-to-digital converter (ADC), to convert the received multi-carrier signal in analog form into a digital signal, and obtain the data of the multi-carrier signal after the conversion of analog-to-digital. To reduce power consumption, a low-power amplifier circuit and a low-power MCU can be used here.

Step S202: setting the parameters required for a receiver detecting the multi-carrier signal in the step S101.

Step S203: storing the data of the multi-carrier signal in a first buffer with a window length of N=1024 in real time, to obtain buffered data.

Step S204: setting a timer for triggering the detecting the multi-carrier signal received by the receiver at a certain time interval, and re-storing the buffered data in a second buffer S with the same window length during the detecting. In the illustrated embodiment, the certain time interval is 50 ins.

Step S205: taking absolute values of elements in the second buffer S and summing the absolute values to obtain a sum $S_1$.

Step S206: comparing the sum $S_1$ with the time-domain threshold $W_1$, entering step 207 when the sum $S_1$ is greater than the time-domain threshold $W_1$, and returning to the step S204 and waiting for the timer to trigger again when the sum $S_1$ is not greater than the time-domain threshold $W_1$.

Step S207: dividing 1024 elements into K=4 groups with 256 elements in each of the 4 groups, and obtaining the number of the wake-up frequency points in each of the 4 groups being greater than the frequency-domain threshold $W_2$ by performing the following steps S208 through S211.

Step S208: performing real Fourier transform on the elements of each of the 4 groups to obtain amplitudes of N/2K=128 frequency points.

Step S209: selecting the amplitudes $A_1$=808, $A_2$=1042, $A_3$=1277 and $A_4$=1511 respectively corresponding to the wake-up frequency points 8073 Hz, 10416 Hz, 12760 Hz and 15104 Hz designed by the transmitter from the amplitudes of the 128 frequency points; and selecting amplitudes of second frequency points between the wake-up frequency points from the amplitudes of the 128 frequency points as reference amplitudes. In the illustrated embodiment, the amplitudes $B_1$=202, $B_2$=232 and $B_3$=255 of the reference frequency points 9244 Hz, 11588 Hz and 13932 Hz between the wake-up frequency points are selected as the reference amplitudes.

Step S210: weighting the reference amplitudes $B_1$, $B_2$ and $B_3$ to obtain the frequency-domain threshold $W_2$, where $W_2=2*(B_1+B_2+B_3)/3=460$.

Step S211: comparing each of the amplitudes $A_1$, $A_2$, . . . , $A_M$ of the wake-up frequency points with the frequency-domain threshold $W_2$ to obtain the number $N_a$ of $A_i$ greater than $W_2$. In the illustrated embodiment, the number $N_a$ of the first group $A_i$ greater than $W_2$ is 4.

Step S212: comparing the number $N_a$ of each of the K=4 groups with the threshold $N_A$, recording that a number $N_k$ of groups with the number $N_a$ greater than the threshold $N_A$, turning on a power supply of a rear-end circuit when the number of groups $N_k$ is greater than the wake-up threshold $N_K$, or returning to the step S204 when the number of groups $N_k$ is not greater than the wake-up threshold $N_K$. In the illustrated embodiment, $N_A$=3, $N_k$ is 4, $N_K$ is 3, thus $N_a>N_A$, $N_k$=4, $N_k>N_K$. Therefore, it indicates that the arrival of a wake-up waveform has been detected, and then the MCU will turn on the power supply of the rear-end high-power circuit to make the underwater acoustic communicator enter the working mode.

Those skilled in the art can understand that the above is only a preferred embodiment of the disclosure and is not used to limit the disclosure. Although the disclosure is described in detail with reference to the above examples, those skilled in the art can still modify the technical solution recorded in the above embodiment or replace some of the technical features equally. Any modifications and equivalent replacements made within the spirit and principles of the disclosure shall be included in the protection scope of the disclosure.

What is claimed is:

1. A low-computation underwater acoustic wake-up method based on a multi-carrier signal, comprising:
    step S1: generating the multi-carrier signal at a transmitter, comprising:
        step S101: obtaining a frequency band of the multi-carrier signal and parameters required for a receiver detecting the multi-carrier signal, wherein the parameters comprise a sampling rate of a single-chip microcomputer, a data buffer size N when the receiver receives the multi-carrier signal, the group number K of N numbers of elements, a time-domain threshold, a threshold of a number of amplitudes of wake-up frequency points in a current group being greater than a frequency-domain threshold, and a wake-up threshold; and K is a positive integer, N is a positive integer;
        step S102: calculating frequency points to be selected according to the obtained parameters, and selecting the wake-up frequency points from the frequency points to be selected as frequencies carried by the multi-carrier signal;
        step S103: determining a duration of the multi-carrier signal;
        step S104: shifting phases of the wake-up frequency points to generate the multi-carrier signal with a minimum peak to average power ratio (PAPR); storing the generated multi-carrier signal at the transmitter and transmitting the multi-carrier signal for waking up the receiver;
    step S2: detecting the multi-carrier signal at the receiver, comprising:
        step S201: passing the multi-carrier signal received by the receiver through an energy transducer and then through an amplifier circuit and an analog-to-digital converter, to convert the received multi-carrier signal in analog form into a digital signal, and obtain data of the multi-carrier signal after the conversion of analog-to-digital;
        step S202: setting the parameters in the step S101;
        step S203: storing the data of the multi-carrier signal in a first buffer with a window length N in real time, to obtain buffered data;
        step S204: setting a timer for triggering detecting of the multi-carrier signal received by the receiver at a certain time interval, and re-storing the buffered data in a second buffer with a same window length during the detecting;
        step S205: taking absolute values of elements in the second buffer and summing the absolute values to obtain a sum;
        step S206: comparing the sum with the time-domain threshold, entering step S207 when the sum is greater than the time-domain threshold; or returning to the step S204 and waiting for the timer to trigger again when the sum is not greater than the time-domain threshold;
        step S207: dividing the N number of elements into K number of groups, with N/K number of elements in each of the K number of groups, and obtaining the number of the amplitudes of the wake-up frequency points in each of the K number of groups being greater than the frequency-domain threshold by performing steps S208 through S211 for each of the K number of groups:

step S208: performing real Fourier transform on the elements in the current group to obtain amplitudes of N/2K frequency points;

step S209: selecting the amplitudes respectively corresponding to the wake-up frequency points from the amplitudes, and selecting amplitudes of frequency points between the wake-up frequency points from the amplitudes as reference amplitudes;

step S210: weighting the reference amplitudes to obtain the frequency-domain threshold;

step S211: comparing each of the amplitudes of the wake-up frequency points with the frequency-domain threshold to obtain the number of the amplitudes of the wake-up frequency points greater than the frequency-domain threshold; and step S212: comparing the number of each of the K number of groups with the threshold of the number of amplitudes of wake-up frequency points in the current group being greater than the frequency-domain threshold, and recording that a number of groups with the number greater than the threshold of the number of amplitudes of wake-up frequency points in the current group being greater than the frequency-domain threshold; turning on a power supply of a rear-end circuit when the number of groups is greater than the wake-up threshold, or returning to the step S204 when the number of groups is not greater than the wake-up threshold.

2. The method according to claim 1, wherein the calculating frequency points to be selected in the step S102 comprises:

calculating the frequency points to be selected according to a formula $\Delta f = K*Fs/N$, where $\Delta f$ presents a step size, K presents the group number, Fs presents the sampling rate, N represents the data buffer size.

3. The method according to claim 1, wherein the shifting phases of the respective wake-up frequency points to different degrees to generate the multi-carrier signal with a minimum peak to average power ratio specifically comprises:

randomly superposing phase changes when generating a single-frequency signal;

calculating PAPRs of the single-frequency signal superposed with the phase changes during synthesizing the multi-carrier signal;

obtaining a phase corresponding to a minimum one of the calculated PAPRs as a resultant phase; and generating the multi-carrier signal by using the resultant phase.

* * * * *